United States Patent [19]

Sagayama

[11] Patent Number: 5,793,939
[45] Date of Patent: Aug. 11, 1998

[54] PRINT CONTROLLING APPARATUS

[75] Inventor: Toru Sagayama, Hyogo, Japan

[73] Assignees: Mitsubishi Electric Semiconductor Software Co., Ltd., Yyogo; Mitsubishi Denki Kabushiki Kaisha, Tokyo, both of Japan

[21] Appl. No.: 733,324

[22] Filed: Oct. 17, 1996

[30] Foreign Application Priority Data

May 13, 1996 [JP] Japan ................. 8-117569

[51] Int. Cl.$^6$ ................................. G06K 15/00
[52] U.S. Cl. ............................. 395/115; 395/108
[58] Field of Search ......................... 395/115, 116, 395/108, 509, 510, 512, 520, 521, 525, 526; 347/180, 181, 182

[56] References Cited

U.S. PATENT DOCUMENTS

| 4,368,491 | 1/1983 | Saito ..................... 347/184 |
| 5,109,520 | 4/1992 | Knierim ................. 395/509 |

FOREIGN PATENT DOCUMENTS

| 62-152040 | 7/1987 | Japan. |
| 5108280 | 4/1993 | Japan. |
| 7144445 | 6/1995 | Japan. |

*Primary Examiner*—Arthur G. Evans
*Attorney, Agent, or Firm*—Leydig, Voit & Mayer, Ltd

[57] ABSTRACT

A print controlling apparatus includes a printing head with columns of printing elements. A buffer circuit includes data storage columns corresponding to the printing element columns on the printing head. The buffer circuit also includes data storage columns corresponding to a printing region between the printing element columns on the printing head. Printing data is transferred from the data storage columns in the buffer circuit corresponding to the printing element columns on the printing head. After the data is transferred from the data storage columns to the printing head, a shift controlling circuit shifts printing data in the data storage columns corresponding to the intermediate region to the data storage columns corresponding to the printing element columns on the printing head. By storing and shifting data from the data storage columns corresponding to the printing region between the printing element columns on the printing head, processing time during a print cycle is reduced.

10 Claims, 7 Drawing Sheets

PRINT CONTROLLING APPARATUS

BACKGROUND OF THE INVENTION

1. Field of the Invention

The present invention relates to a print controlling apparatus for transferring data to the printing head of a serial printer.

2. Description of the Prior Art

FIG. 1 is a block diagram showing a structure of a print controlling apparatus of a prior art device disclosed for example in No. JP-A-144445/7 (1995). Referring to FIG. 1, reference numeral 12 denotes a RAM for storing printing data, 101 denotes a CPU for controlling data transfer, 105 denotes a printing data holding circuit for temporarily holding printing data, and 107 denotes an output circuit for supplying a printing head (not shown) with printing data at predetermined timing. In No. JP-A-144445/7, a dot impact printer is shown as an example of the printer.

Operation of the same will be described below.

The CPU 101 reads printing data from a predetermined address of the RAM 12 and transfers the data to the printing data holding circuit 105. When the data for all of the pins of the printing head are set up in the printing data holding circuit 105, the CPU 101 supplies an enable signal to the output circuit 107. Responding to the enable signal, the output circuit 107 supplies the printing data in the printing data holding circuit 105 to the printing head.

The printing head performs printing on paper by driving the pins corresponding to the printing data. The printing head is horizontally driven by a carriage motor and performs printing sequentially. Accordingly, printing data are transferred from the RAM 12 to the printing data holding circuit 105 through the CPU 101 in synchronism with the movement of the printing head.

FIG. 2 is a diagram showing a front view of an example of a printing head of an ink jet printer and the content of the RAM 12. In this example, there is shown a printing head 200 with six nozzle columns, each of which has seven ink jetting nozzles 202, provided thereon. In the printing head 200, there are gaps 204 and 206 provided between nozzle columns for convenience of manufacture of the printing head 200.

The printing data are continuously stored in the RAM 12. Namely, the data are placed thereon in the same arrangement as the dot arrangement. However, the nozzle columns are arranged discretely as shown in FIG. 2. Accordingly, it becomes necessary to have the discretely arranged blocks 301–305 of the printing data read out from the RAM 12 and transferred to the printing data holding circuit 105. To achieve this, the CPU 101, upon transferring the printing data of the block 300, for example, to the printing data holding circuit 105, must calculate the head address of the block 301 in the RAM 12 to read out the block.

FIG. 3 is a timing chart showing an outline of a printing process. As shown in FIG. 3, the data transfer is controlled by a trigger signal 58 generated at regular intervals to indicate the start of the transfer of the printing data. The trigger signal 58 is synchronized with the movement of the printing head 200. Accordingly, the printing data of the six blocks shown in FIG. 2 must be transferred within the period between the times of generation of two trigger signals 58. The period required for the transfer process is indicated by A in FIG. 3. The CPU 101 also performs such processes as developing the data transferred from the side of a computer (not shown) into printing data. Such processes must be finished within the remaining period indicated by B in FIG. 3. The period between the timing of generation of two trigger signals 58 will hereinafter be called one printing period.

If the period B is longer, i.e., if the period A is shorter, the time allowed for such processes as the development of data into the printing data becomes longer and, therefore, the throughput of the printer can be improved. In these years, however, the number of dots is tending to increase to meet the demand for improvement of the printing quality. Namely, the quantity of the transferred printing data is tending to increase. Further, since the moving speed of the printing head 200 is tending to increase to meet the demand for increase in printing speed, the period of the trigger signal 58 is becoming shorter. Therefore, the period B is becoming shorter and securing desired printing speeds is becoming difficult.

Although the case where a string transfer is performed, i.e., the case where the CPU 101 takes in data from the RAM 12 and transfers the data to the printing data holding circuit 105, has been shown above as an example, it is also possible that the CPU 101 transfers data by means of an incorporated DMA controller or an external DMA controller. In such case, the CPU 101 supplies the DMA controller with the head addresses of the blocks 300–305 in the RAM 12 sequentially. Further, it is also possible to use an array chain DMA transfer system in which the CPU 101 supplies the DMA controller with the head addresses of the blocks 300–305 at one time and the DMA controller, upon completion of transfer of the printing data for one block, starts the transfer of the printing data of the next block immediately. Even when the DMA transfer system is used, however, the CPU 101 must calculate the head addresses of the blocks 300–305.

Since, conventional printing control apparatus have been structured as described above, there has been a problem that they cannot completely meet the demands for improvement in the printing quality and increase of printing speeds.

SUMMARY OF THE INVENTION

The invention was made in order to solve the above mentioned problem, and accordingly it is an object of the invention to provide a print controlling apparatus whereby the time required for transfer control of printing data can be shortened and the throughput of the printer can be improved.

The print controlling apparatus according to the invention comprises buffer circuits for storing printing data corresponding to dots provided in a printing region between at least two columns of printing elements of a plurality of columns of printing elements of a printing head and buffer selector circuits for deciding as to at which portion of each buffer circuit the printing data is to be stored.

Incidentally, the printing region between two columns of printing elements is defined so that it includes the region at which the two columns of printing elements make printing in this description.

The print controlling apparatus according to the invention may comprise a latch circuit for latching printing data and a counter circuit for counting the number of transferred data and supplying the buffer circuit with the address corresponding to the count number as the address for storing therein the latch data of the latch circuit.

The print controlling apparatus according to the invention may comprise a transfer control circuit for transferring the printing data corresponding to one column of printing elements to each buffer circuit during one printing period.

The printer control apparatus according to the invention may be of such structure that the buffer circuits are provided by buffer circuits being the same in number as the groups obtained by dividing a plurality of columns of printing elements into the groups each having two columns of the printing elements and each buffer selector circuit is provided correspondingly to each of the buffer circuits.

Further, the print controlling apparatus according to the invention may be of such structure that the buffer circuit stores the printing data corresponding to the dots provided in the printing region between the leftmost column of printing elements and the rightmost column of printing elements.

DETAILED DESCRIPTION OF THE PREFERRED EMBODIMENTS

Figure 1:
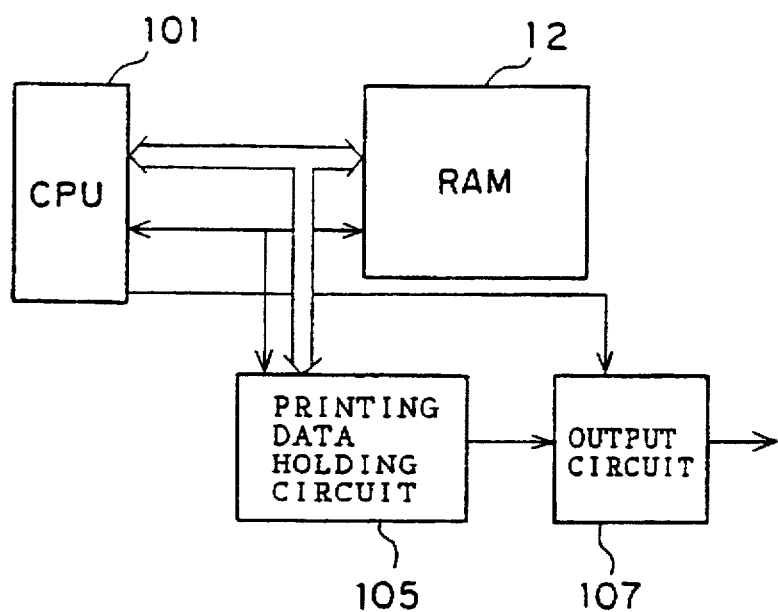
FIG. 1 is a block diagram showing a structure of a conventional print controlling apparatus.
Figure 4:
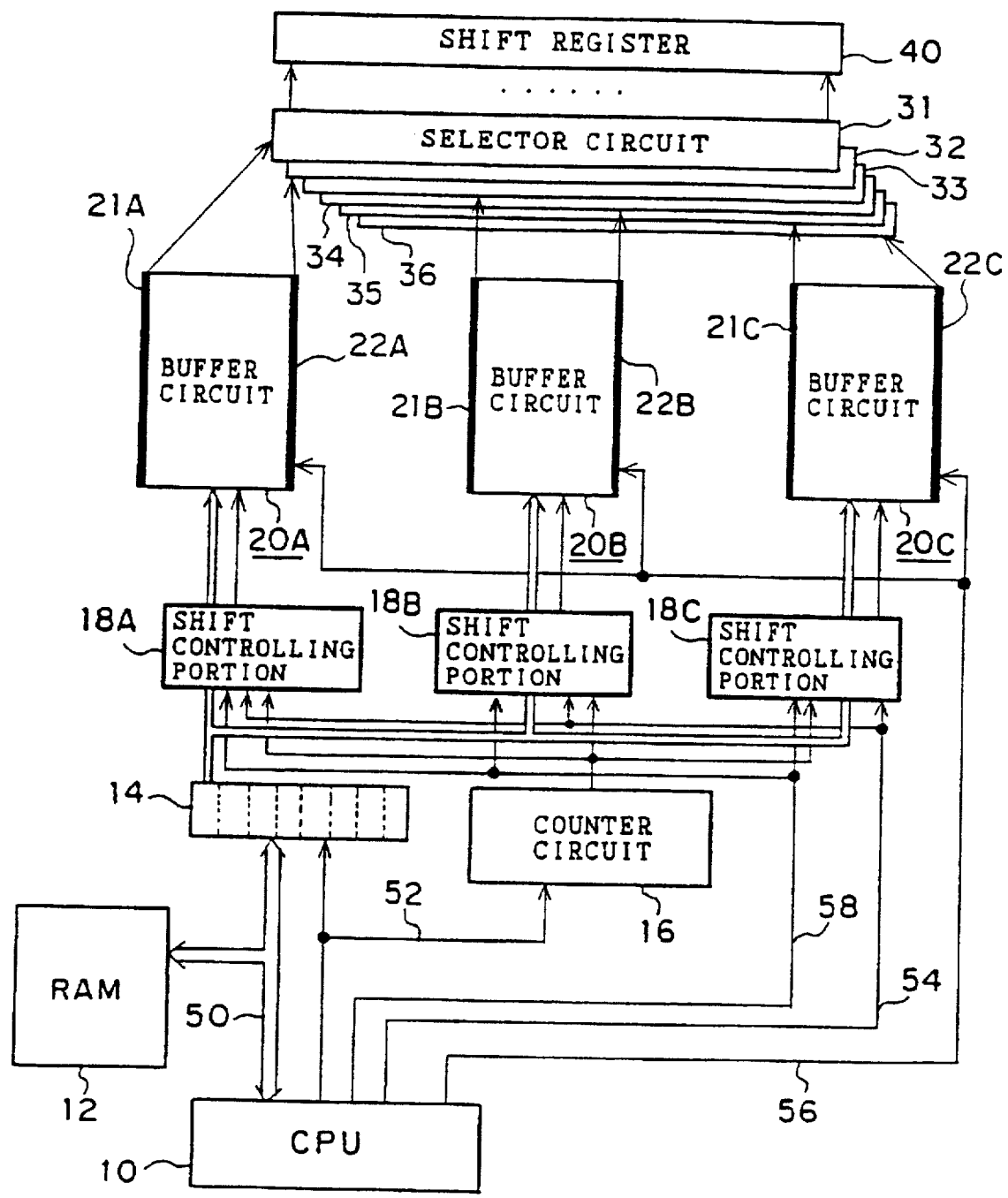
FIG. 4 is a block diagram showing a structure of a print controlling apparatus according to a first embodiment of the invention.

FIG. 4 is a block diagram showing a structure of a print controlling apparatus according to a first embodiment of the invention. Referring to FIG. 1, reference numeral 10 denotes a CPU for controlling data transfer, 12 denotes a RAM for storing printing data, 14 denotes a latch circuit for latching printing data from the RAM 12, 16 denotes a counter circuit for counting the number of data transfers, 18A, 18B, and 18C denote shift controlling portions for controlling shifting of printing data in the buffer circuits 20A, 20B, and 20C, respectively, 31–36 denote selector circuits for selecting bits used for printing from the printing data coming from the buffer circuits 20A, 20B, and 20C, 40 denotes a shift register for transferring data to the printing head, and 50 denotes a bus. In the buffer circuits 20A, 20B, and 20C, reference numerals 21A, 21B, and 21C indicate the first columns and 22A, 22B, and 22C indicate the 16th columns. Further, reference numeral 52 denotes a transfer signal indicating a transfer of one-byte data, 54 denotes a direction indicating signal indicating the printing direction, 56 denotes an initialization signal for initializing the buffer circuits 20A, 20B, and 20C, and 58 denotes a trigger signal indicating the start of the printing data transfer. A particular example of the buffer circuits 20A, 20B, and 20C is shown in FIG. 6.

Here, the buffer selector circuits for deciding as to at which regions of the buffer circuits 20A, 20B, and 20C the printing data are to be stored are realized by the shift controlling portions 18A, 18B, and 18C. Further, the transfer controlling circuit for transferring the printing data corresponding to one column of printing elements to each of the buffer circuits 20A, 20B, and 20C is realized by the counter circuit 16.

Figure 5:
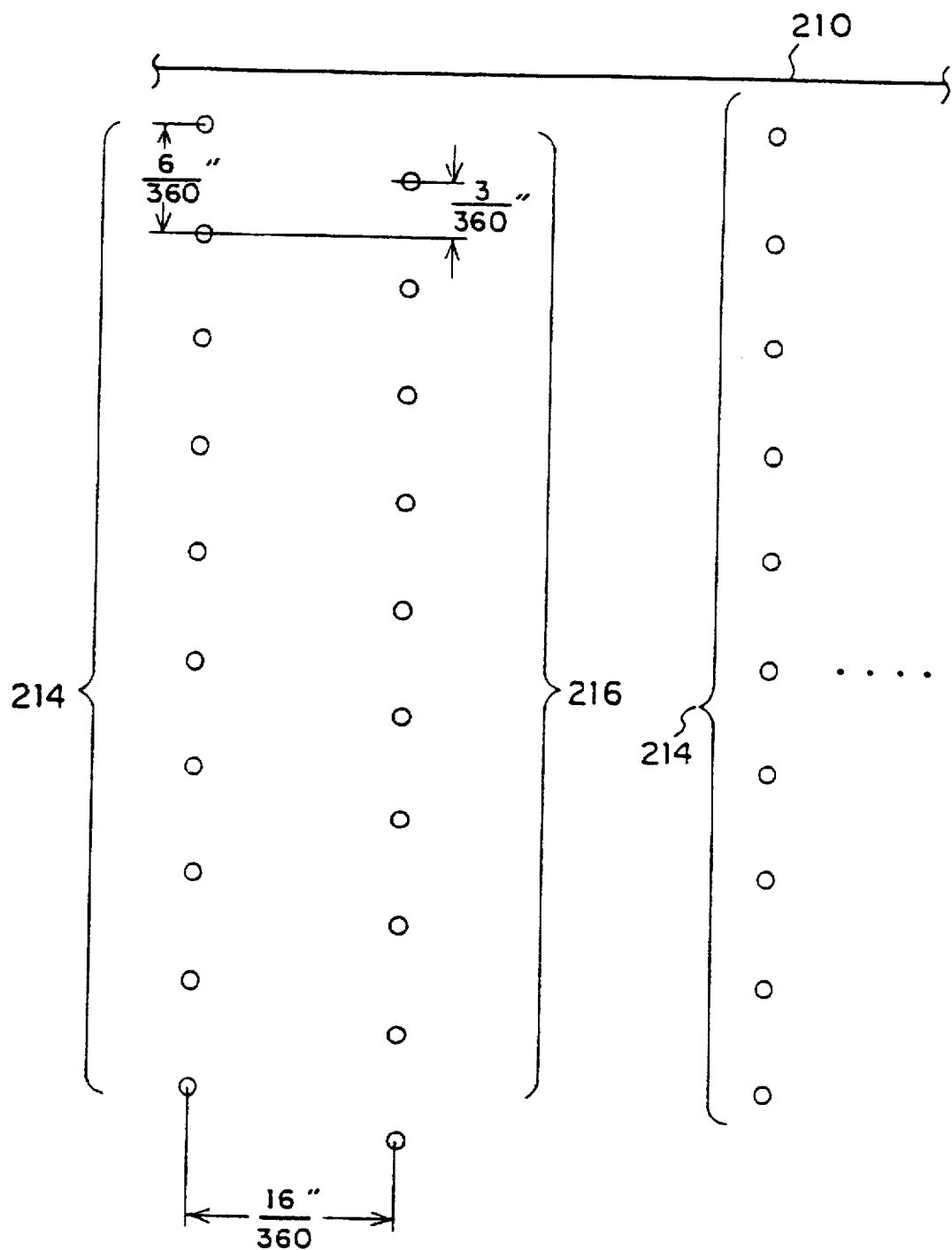
FIG. 5 is a drawing explanatory of a portion of an example of a printing head.

FIG. 5 is a drawing explanatory of a portion of an example of a printing head. The printing head 210 of this example is that of an ink jet printer capable of printing up to 360 dpi (dots per inch). Further, in each of the nozzle columns 214 and 216, there are provided 10 nozzles at intervals of $6/360$ inches. Each nozzle in the nozzle column 214 is shifted from each corresponding nozzle in the nozzle column 216 by $3/360$ inches in the columnar direction. The nozzle column 214 on the left-hand side and the nozzle column 216 on the right-hand side are disposed $16/360$ inches apart. The printing head 210 has three groups of nozzle columns each thereof being formed of two nozzle columns 214 and 216.

Figure 6:
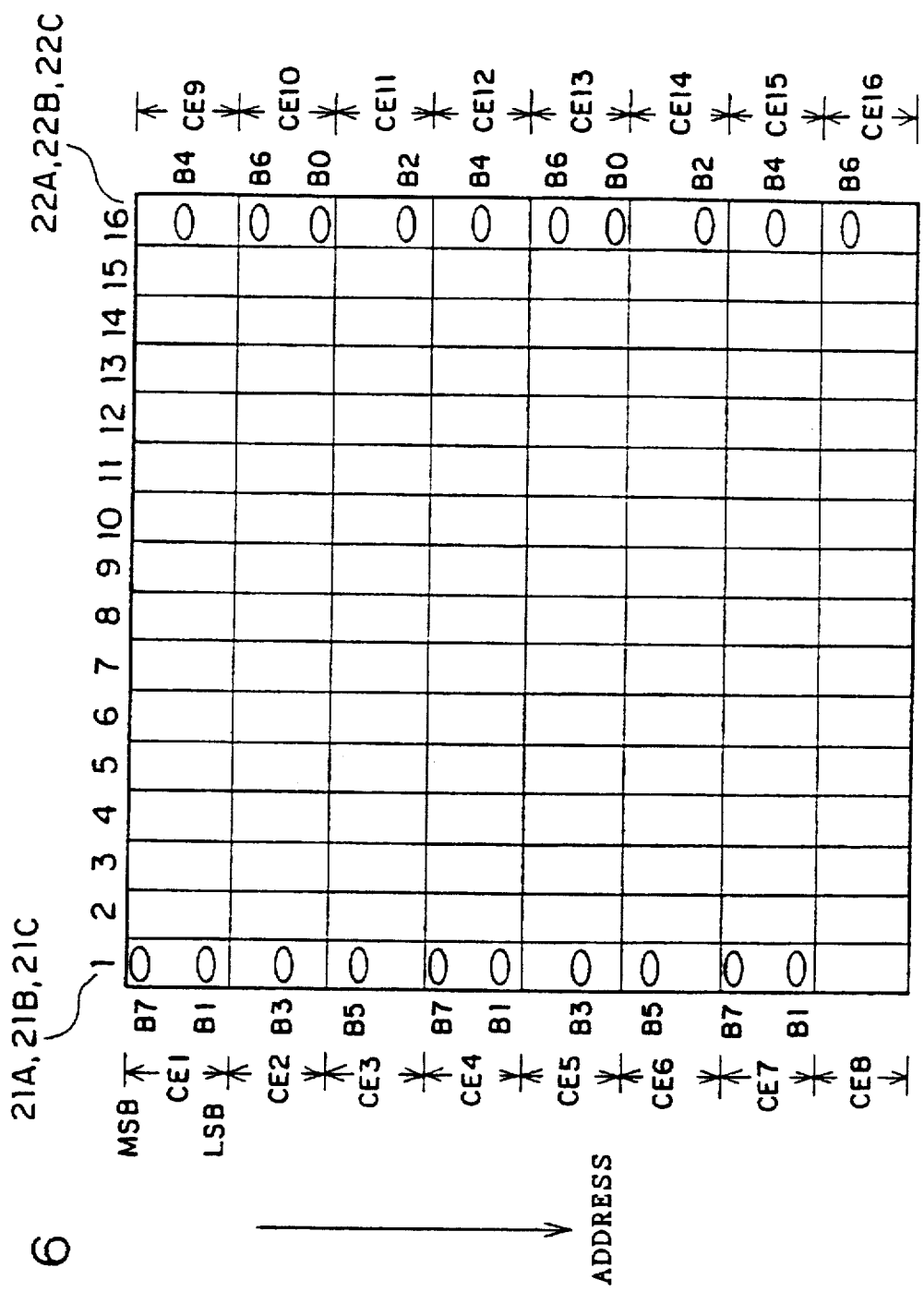
FIG. 6 is a drawing explanatory of the content of a buffer circuit.

FIG. 6 is a drawing explanatory of the content of each of three buffer circuits 20A, 20B, and 20C. Each of the buffer circuits 20A, 20B, and 20C corresponds to each group of the nozzle columns 214 and 216. As shown in FIG. 6, each of the buffer circuits 20A, 20B, and 20C stores printing data for 16 columns. Namely, each stores the printing data to be printed in the region between the nozzle column 214 on the left-hand side and the nozzle column 216 on the right-hand side in each group.

When printing is carried out in the 360 dpi mode, the bits to be supplied to each nozzle of the nozzle columns 214 and 216 are included, for example, in eight bytes CE1–CE8 in the first column 21A, 21B, 21C and eight bytes CE9–CE16 in the 16th column 22A, 22B, 22C. The bits indicated by circular symbols in the printing data in the two columns are the bits used for printing. Namely, the bits indicated by the circular symbols correspond to the nozzles of the nozzle columns 214 and 216.

Operation of the same will be described below.

First, controlling of the transfer of the printing data from the RAM 12 to the buffer circuits 20A, 20B, and 20C will be described. The CPU 10 searches the RAM 12 for the head address at which the printing data to be stored in a column of the buffer circuit 20A is retained. Then, the CPU 10 sequentially sends out the printing data of eight bytes from that address to the data bus 50. The CPU 10 outputs a transfer signal 52 in synchronism with the transfer of one byte. The counter circuit 16 counts the number of the output transfer signals 52. The count value is input to the shift controlling portion 18A. The shift controlling portion 18A converts the count value from the counter circuit 16 into a storing address of the printing data in the buffer circuit 20A and, thereby, the buffer circuit 20A is subjected to addressing. The latch circuit 14 takes in the data on the data bus 50 in response to the transfer signal 52 and sets up the data in the buffer circuit 20A. The number of the printing data for one column is set up in the counter circuit 16 as its initial value. Accordingly, when the count value of the counter circuit 16 has become 0, the printing data have been set up, for example, in the 16th column of the buffer circuit 20A.

Data transfer controlling is similarly performed for the buffer circuits 20B and 20C. At this time, though the counter circuit 16 operates the same as when the printing data is written in the buffer circuit 20A, the count values are input to the shift controlling portions 18B and 18C. Accordingly, the buffer circuits 20B and 20C are subjected to addressing by the count value of the counter circuit 16 through the shift controlling portions 18B and 18C.

Controlling of the outputting of the printing data in the buffer circuits 20A, 20B, and 20C will now be described. When the printing data for one column has been set up in the buffer circuit 20A, the printing data in the first column 21A of the buffer circuit 20A and the printing data in the 16th column 22A of the same are transferred to the selector circuits 31 and 32. The selector circuit 31 selects the bits corresponding to the nozzle positions of the nozzle column 214 from the printing data transferred from the buffer circuit 20A and transfers the selected bits to the shift register 40. Here, the selected bits are the bits of the first column 21A indicated by the circular symbols in FIG. 6. The selector circuit 32 selects the bits corresponding to the nozzle positions of the nozzle column 216 from the printing data transferred from the buffer circuit 20A and transfers the selected bits to the shift register 40. Here, the selected bits are the bits of the 16th column 22A indicated by the circular symbols in FIG. 6.

Similar data outputting control is performed for the buffer circuits 20B and 20C.

As a result, the data out of the printing data in the columns 21A, 22A, 21B, 22B, 21C, and 22C of the buffer circuits 20A, 20B, and 20C corresponding to the nozzle positions are set up in the shift register 40. The data set up in the shift register 40 are supplied to the printing head 210. Namely, as the data from the selector circuits 31–36 are set up in the shift register 40, the printing head 210 is driven and ink is expelled from the nozzles of the printing head 210 in accordance with the data in the shift register 40.

When the outputting of the printing data from the buffer circuits 20A, 20B, and 20C has been completed, the controlling of the transfer of the printing data for the next block is started. In the present example, a two-way printing system is used, namely, printing is performed both when the printing head 210 moves rightward and when the same moves leftward. Accordingly, the CPU 10 supplies each of the shift controlling portions 18A, 18B, and 18C with a direction indicating signal 54 when printing in each horizontal direction is started. The shift controlling portions 18A, 18B, and 18C, when a trigger signal 58 indicating the start of a printing data transfer is output thereto, shift the printing data in each column of the buffer circuits 20A, 20B, and 20C in accordance with the indication of the direction indicating signal 54. When the current stage is that in which the printing head 210 is moving to the right over the paper, the printing data stored in the second columns are shifted to the first columns 21A, 21B, and 21C and the printing data in the 16th columns 22A, 22B, and 22C are shifted to the 15th columns. Then, the printing data in the first columns 21A, 21B, and 21C of the buffer circuits 20A, 20B, and 20C and the printing data in the 16th columns 22A, 22B, and 22C of the same are transferred to the corresponding selector circuits 31–36. Namely, the trigger signal 58 serves for triggering the transfer of the printing data and also serves as a buffer select control signal.

Then, the printing data to be printed next by the right-hand nozzle column 216 of each group in the printing head 210 are transferred from the RAM 12 to the 16th columns 22A, 22B, and 22C of the buffer circuits 20A, 20B, and 20C. The transfer control is performed the same as described above. Here, the printing data to be printed next by the left-hand nozzle column 214 of each group in the printing head 210 are not transferred from the RAM 12 to the buffer circuits 20A, 20B, and 20C. It is because those printing data are present in the buffer circuits 20A, 20B, and 20C being already shifted from the second columns to the first columns 21A, 21B, and 21C.

Figure 2:
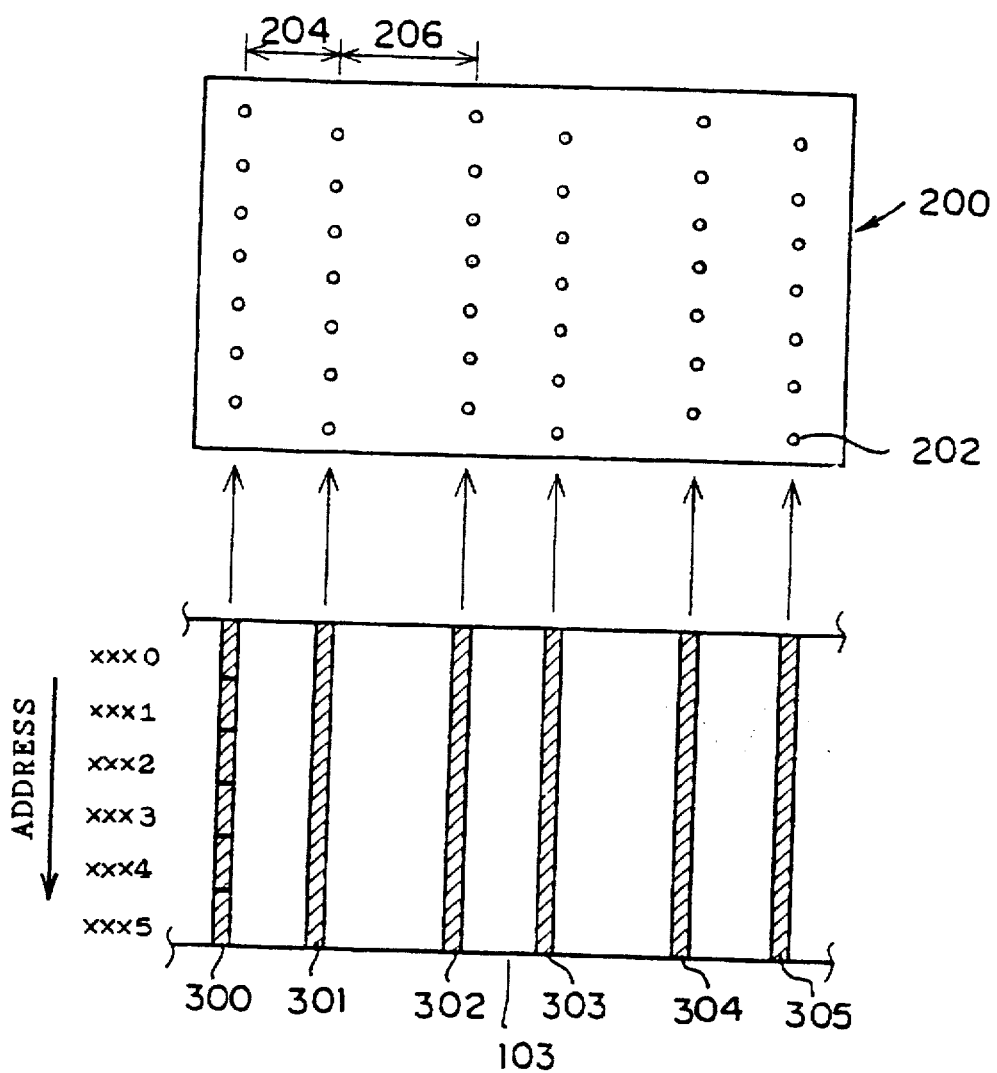
FIG. 2 is a diagram showing a front view of an example of a printing head of an ink jet printer and the content of the RAM.
Figure 3:
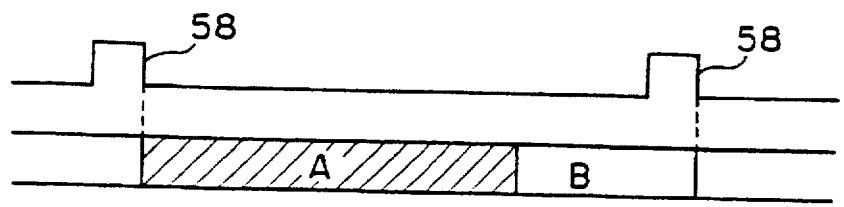
FIG. 3 is a timing chart showing an outline of a printing process.
Figure 7:
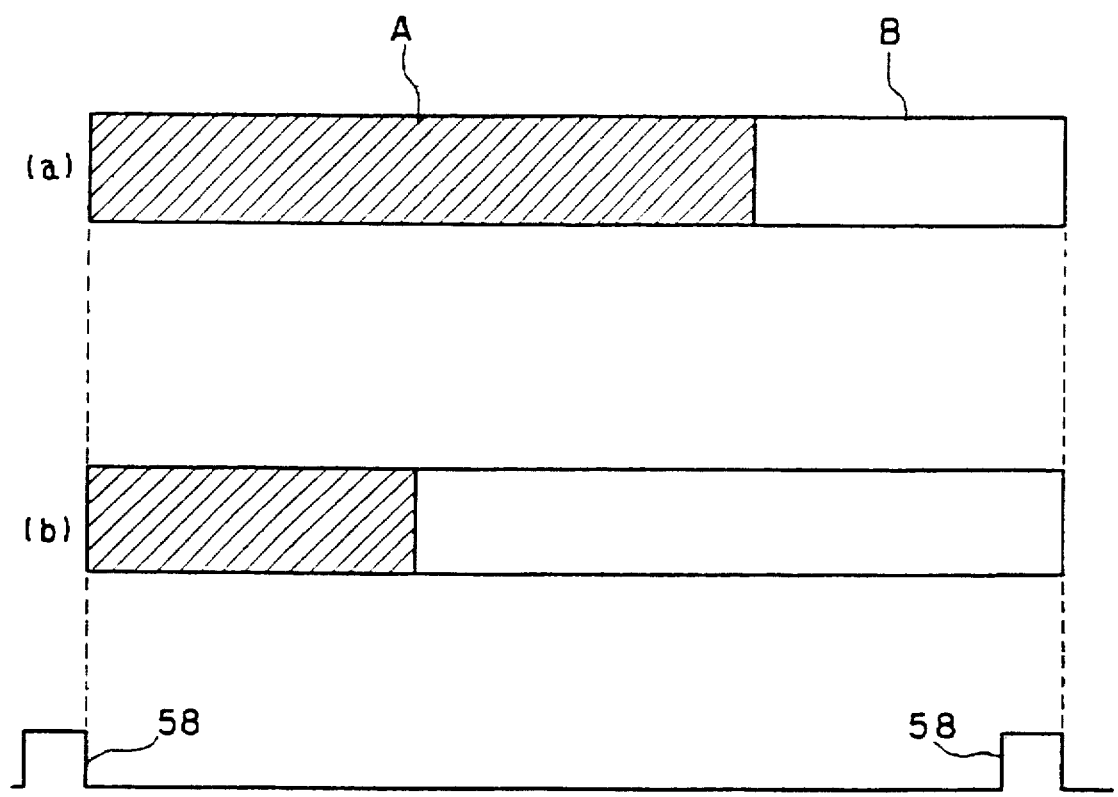
FIG. 7 is a drawing explanatory of the period required for a data transfer process in one printing period.

When, as described above, the apparatus is provided with the buffer circuits 20A, 20B, and 20C for storing the printing data to be printed in the region between the left-hand nozzle column 214 and the right-hand nozzle column 216 of each group of the printing head 210, it is enough if the printing data for three blocks are transferred from the RAM 12 to the buffer circuits 20A, 20B, and 20C within one printing period. In the conventional print controlling apparatus, it was necessary, as shown in FIG. 2, that printing data for six blocks be transferred from the RAM 12 to the printing data holding circuit 105 within one printing period. Therefore, in the mode of the present embodiment, the quantity of data transfer for each printing period becomes half the quantity of data transfer in the conventional case. Accordingly, the quantity of calculation of the head address made by the CPU 10 during one printing period also becomes one half. Therefore, the period of time required for data transfer processing during one printing period (refer to FIG. 7(b)) becomes shorter than that in the conventional case (refer to FIG. 7(a)).

Further, the printing data from the RAM 12 are latched by the latch circuit 14 and the counter circuit 16 counts the number of transfers of the printing data and supplies the buffer circuit 20A, 20B, 20C with the count value as the address through the shift controlling portions 18A, 18B, and 18C or directly. Namely, the latch data of the latch circuit 14 are stored in the buffer circuit 20A, 20B, 20C at the address corresponding to the count value coming from the counter circuit 16. The buffer circuit 20A, 20B, and 20C can acknowledge the completion of the transfer of the data for one column by the counting up of the counter circuit 16. Accordingly, the CPU 10 does not need to control the number of the transfers of the printing data and, hence, the load on the software for transferring printing data can be lessened. Accordingly, an economical and low-performance CPU 10 can be used.

The CPU 10 outputs an initialization signal 56 at the start of printing in the direction of each line. The buffer circuits 20A, 20B, and 20C are initialized in response to the initialization signal 56. Namely, white data are generally set up in all the bits as printing data. Therefore, according to the above described manner of controlling, during a period before the buffer circuits 20A, 20B, and 20C are fully stored with the printing data for 16 columns for the first time, wholly white printing for each column continues. However, since the initial position of the printing head 210 in the direction of a line is generally in a margin region where no printing is required, there arises no problem.

Although, in the present embodiment, an example in which the shift controlling portions 18A, 18B, and 18C shift the content of the buffer circuits 20A, 20B, and 20C has been shown, it may be well if three column selector circuits are provided instead of the shift controlling portions 18A, 18B, and 18C. In that case, each of the column selector circuits specifies the column where new printing data are to be stored in the buffer circuits 20A, 20B, and 20C. In such case, since shifting of the printing data in the buffer circuits 20A, 20B, and 20C is not performed, the throughput is further improved.

Although, in the mode of the present embodiment, an example in which six selector circuits 31–36 are used has been described, it may be well if selector circuits are provided for the number of columns, out of the six columns of the buffer circuits 20A, 20B, and 20C, to which printing data are output at the same time.

Figure 8:
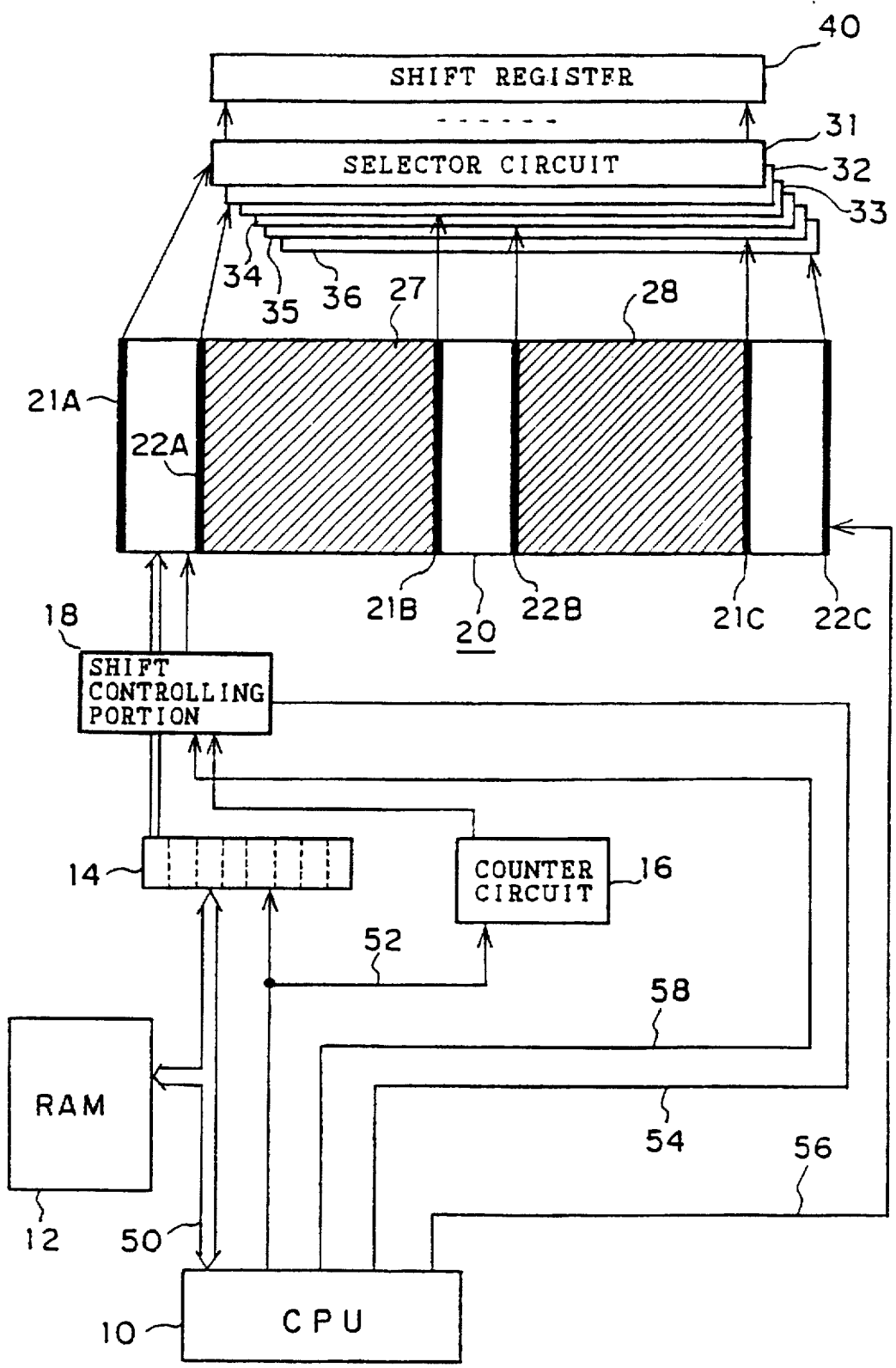
FIG. 8 is a block diagram showing a structure of a print controlling apparatus according to a second embodiment of the invention.

FIG. 8 is a block diagram showing a structure of a print controlling apparatus according to a second embodiment of the invention. Referring to FIG. 8, reference numeral 18 denotes a shift controlling portion (buffer selector circuit) for shifting printing data in the buffer circuit 20. In this case, the buffer circuit 20 stores printing data to be printed in the region between the nozzle column 214 on the leftmost side of the printing head 210 and the nozzle column 216 on the rightmost side of the same. In the buffer circuit 20, reference numerals 21A and 22A denote columns corresponding to the nozzle columns 214 and 216 of the group on the left-hand side of the printing head 210. Reference numerals 21B and 22B denote the columns corresponding to the nozzle columns 214 and 216 of the group in the middle of the printing head 210. Reference numerals 21C and 22C denote columns corresponding to the nozzle columns 214 and 216 of the group on the right-hand side of the printing head 210. Reference numerals 27 and 28 denote regions with a greater capacity than the capacity of the buffer circuits 20A, 20B, and 20C in the first embodiment. Other components are the same as the components of the first embodiment.

Operation of the same will be described below.

When outputting of the printing data in the buffer circuit 20 has been completed, transfer controlling of the printing data of the next block is started. If the current stage is such that the printing head 210 is moving rightward over the paper, the shift controlling portion 18 controls such that the printing data of each column of the buffer circuit 20 are shifted to the column on the left. Then, the printing data to be printed next by the nozzle column 216 on the rightmost side of the printing head 210 are transferred from the RAM 12 to the column 22C on the rightmost side of the buffer circuit 20. The transfer control is performed the same as in the case of the first embodiment. Here, the printing data to be printed next by the nozzle columns 214 and 216 of the group on the left-hand side of the printing head 210, the nozzle columns 214 and 216 of the group in the middle of the same, and the nozzle column 214 on the left-hand side of the group on the right-hand side of the same are not transferred from the RAM 12 to the buffer circuit 20 because these data are already present in the buffer circuit 20.

Thus, when a buffer circuit 20 capable of storing the printing data to be printed in the region between the nozzle column 214 on the leftmost side of the printing head 210 and the nozzle column on the rightmost side of the same is provided, though the capacity of the buffer circuit 20 increases by the quantity corresponding to the regions 27 and 28 as compared with the case of the first embodiment, the quantity of data transfer in one printing period becomes ⅙ of the quantity of data transfer in the conventional case. Accordingly, the quantity of calculation of the head address made by the CPU 10 in one printing period also becomes ⅙. Therefore, the period of time required for data transfer processing in one printing period can be greatly reduced from the period A in the conventional case.

Also in this mode of the present embodiment, a column selector circuit can be used instead of the shift controlling portion 18.

Since the print controlling apparatus is provided with a buffer circuit capable of storing the printing data corresponding to the dots in the printing region between at least two columns of the printing elements out of a plurality of columns of the printing elements of the printing head 210 and a buffer selector circuit for deciding as to at which region of each buffer circuit the printing data are to be stored, such meritorious effects can be obtained that the period of time required for transfer controlling of the printing data at the time when the printing data are supplied to the printing head can be reduced and the throughput of the printer can be improved.

When the print controlling apparatus is provided with a counter circuit for counting the number of transferred data and supplying the count number to the buffer circuit as the address for storing therein the latch data of the latch circuit, an advantage is obtained in that the data transfer continues without the intervention of any software once the transfer of the printing data to the side of the printing head is started and the load on the controlling circuits such as the CPU in the print controlling apparatus can be lessened.

When the print controlling apparatus is provided with a transfer controlling circuit for transferring the printing data corresponding to one column of printing elements to each buffer circuit during one printing period, the transferred quantity of the printing data can further be reduced from the conventional case and the quantity of calculation of the address of the memory wherefrom the printing data are sent out can also be reduced and, therefore, the throughput of the printer can be improved.

Further, when the print controlling apparatus is provided with buffer circuits of the same number as the number of the groups obtained by dividing a plurality columns of printing elements into the groups each thereof having two columns of printing elements, the quantity of transferred printing data can be reduced to one half of that in the conventional case and the quantity of calculation of the address of the memory wherefrom the printing data is transferred can be reduced to one half and, therefore, such a merit can be obtained that the throughput of the printer is improved.

When the print controlling apparatus is provided with a buffer circuit capable of storing the printing data corresponding to the dots provided in the printing region between the column of printing elements on the leftmost side and the column of printing elements on the rightmost side, the transferred quantity of printing data can be reduced to the quantity obtained by dividing that in the conventional case by the number of the columns of printing elements (1/number of columns of printing elements) and the quantity of calculation of the address in the memory wherefrom the printing data are transferred can equally be reduced (to 1/number of columns of printing elements), and, thereby, an advantage occurs in that the throughput of the printer is further be improved can be obtained.

What is claimed is:

1. A print controlling apparatus for supplying printing data to a printing head having a plurality of printing element columns, each column having a plurality of printing elements, the print controlling apparatus comprising:

a memory for storing printing data;

a processing circuit for extracting the printing data from the memory;

a buffer circuit two of said including a plurality of data storage columns for storing the printing data, the plurality of data storage columns including a first data storage column corresponding to a first printing element column, a second data storage column corresponding to a second printing element column, and a third data storage column for storing printing data for a printing region on a substrate between printing regions of the first and second printing element columns;

a shift controlling circuit for inputting printing data from the memory to the buffer circuit and for shifting printing data from the third data storage column to at least one of the first and second data storage columns; and a printing data selector circuit for selecting printing data from the first and second data storage columns to be printed on a substrate.

2. The print controlling apparatus according to claim 1 further comprising:

a latch circuit for latching printing data extracted from the memory; and a counter circuit for counting printing data extracted from the memory and supplying the buffer circuit with an address corresponding to a counted number as the address for storing printing data latched by the latch circuit.

3. The print controlling apparatus according to claim 1, wherein the processing circuit transfers printing data corresponding to one column of printing elements from the memory to the buffer circuit during one printing period.

4. The print controlling apparatus according to claim 1, further comprising a plurality of buffer circuits corresponding in number to a number obtained by dividing the plurality of columns of printing elements into groups, each group including two columns of printing elements, and a plurality of shift controlling circuits corresponding in number to the number of said buffer circuits.

5. The print controlling apparatus according to claim 1, wherein the first printing element column comprises a leftmost printing element column and the second printing element column comprises a rightmost printing element column, the buffer circuit storing printing data corresponding to a printing region on a substrate between the leftmost printing element column and the rightmost printing element column.

6. The print controlling apparatus according to claim 2, wherein the processing circuit transfers printing data corresponding to one column of printing elements from the memory to the buffer circuit within one printing period.

7. The print controlling apparatus according to claim 2, further comprising a plurality of buffer circuits corresponding in number to a number obtained by dividing the plurality of columns of printing elements into groups, each group including two columns of printing elements, and a plurality of shift controlling circuits corresponding in number to the number of the buffer circuits.

8. The print controlling apparatus according to claim 2, wherein the first printing element column comprises a leftmost printing element column and the second printing element column comprises a rightmost printing element column, the buffer circuit storing printing data corresponding to a printing region on a substrate between the leftmost printing element column and the rightmost printing element column.

9. The print controlling apparatus according to claim 3, further comprising a plurality of buffer circuits corresponding in number to a number obtained by dividing the plurality of columns of printing elements into groups, each group including two columns of printing elements, and a plurality of shift controlling circuits corresponding in number to the number of the buffer circuits.

10. The print controlling apparatus according to claim 3, wherein the first printing element column comprises a leftmost printing element column and the second printing element column comprises a rightmost printing element column, the buffer circuit storing printing data corresponding to a printing region on a substrate between the leftmost printing element column and the rightmost printing element column.

* * * * *

UNITED STATES PATENT AND TRADEMARK OFFICE
CERTIFICATE OF CORRECTION

PATENT NO. : 5,793,939
DATED : August 11, 1998
INVENTOR(S) : Sagayama

It is certified that error appears in the above-identified patent and that said Letters Patent is hereby corrected as shown below:

Column 8, Line 49, delete "two of said".

Signed and Sealed this

Eighth Day of December, 1998

Attest:

BRUCE LEHMAN

Attesting Officer     Commissioner of Patents and Trademarks